United States Patent [19]

Harris

[11] Patent Number: 5,099,970
[45] Date of Patent: Mar. 31, 1992

[54] TORQUE-LIMITING CLUTCH BRAKE ASSEMBLY

[75] Inventor: Hugh R. Harris, Libertyville, Ill.

[73] Assignee: Diebel Manufacturing Company, Morton Grove, Ill.

[21] Appl. No.: 698,462

[22] Filed: May 10, 1991

[51] Int. Cl.⁵ .................... F16D 67/02; F16D 7/00
[52] U.S. Cl. ..................... 192/13 R; 192/56 L; 192/DIG. 1; 464/37
[58] Field of Search ............ 192/13 R, DIG. 1, 56 L, 192/70.13; 464/37

[56] References Cited

U.S. PATENT DOCUMENTS

| | | |
|---|---|---|
| 1,855,899 | 4/1932 | Barclay . |
| 2,117,728 | 5/1938 | Katcher .................. 192/107 C |
| 2,264,192 | 11/1941 | Wellman . |
| 2,637,987 | 5/1953 | Hill et al. ............... 464/37 |
| 3,016,119 | 1/1962 | Rosenberger et al. . |
| 3,745,790 | 7/1973 | Ryan ..................... 464/37 |
| 3,763,977 | 10/1973 | Sink ...................... 192/7 |
| 4,043,437 | 8/1977 | Taylor ................. 192/13 R |
| 4,186,826 | 2/1980 | MacKendrick et al. ......... 192/13 R |
| 4,512,450 | 4/1985 | Babcock .............. 192/DIG. 1 X |
| 4,762,215 | 8/1988 | Flotow et al. ........... 192/107 C |
| 4,807,730 | 2/1989 | Kitano et al. ............ 192/13 R |
| 5,000,721 | 3/1991 | Williams ................ 464/37 |

Primary Examiner—Rodney H. Bonck
Attorney, Agent, or Firm—Cook, Egan, McFarron & Manzo, Ltd.

[57] ABSTRACT

A torque-limiting clutch brake having an inner collar which splines to a transmission gearbox input shaft and including a pair of depressions along its outer edge. A torque-limiting intermediate coupling detent member and spacer ring are disposed around the inner collar. Two resilient detents from the coupling member retainingly engage the depressions of the inner collar within a predetermined limit of torque. Two covers, each having a friction facing on their outer surfaces, house the inner collar, coupling member, and spacer ring, and positively engage the coupling member. An assembly clamp ring fits around the two housing covers and secures the assembly together. The inner collar, coupling member, spacer ring, housing covers, and assembly clamp ring each are made up of two separable semi-circular sections to facilitate removal and installation of the clutch brake without lowering and disassembling the vehicle transmission.

22 Claims, 2 Drawing Sheets

TORQUE-LIMITING CLUTCH BRAKE ASSEMBLY

BACKGROUND OF THE INVENTION

The present invention relates to heavy-duty friction clutches of the type used for large automotive vehicles such as trucks, tractor-trailers, and the like and, more particularly, to a torque-limiting clutch brake assembly.

The use and function of a clutch brake are well known in the art, as discussed, for example, by Flowtow et al. (U.S. Pat. No. 4,762,215) and Babcock (U.S. Pat. No. 4,512,450). A clutch brake is a device used to facilitate shifting by retarding the rotation of transmission gears when the clutch is disengaged by the vehicle operator. Typically, a clutch brake is a disk-shaped device which is splined to the gearbox input or drive shaft of a transmission and is activated by a throw-out mechanism when the clutch is disengaged. The spinning clutch brake is thereby sandwiched between the throw-out mechanism and gearbox housing, creating a frictional drag or braking effect to slow the input shaft.

In normal use, a clutch brake wears out and must be replaced, which usually requires lowering and disassembling the vehicle transmission—a time consuming and expensive procedure. However, Babcock (U.S. Pat. No. 4,512,450) discloses a design in which the clutch brake splits into halves so that it can be replaced without extensive disassembly of the transmission. This greatly reduces the cost of replacement.

Torque-limiting designs take a different approach. They reduce the frequency of replacement necessary by improving clutch brake longevity. They accomplish this by permitting the clutch brake to slip when excessive braking pressure is applied, thereby avoiding the excessive stresses which contribute to wear and tear. Also, unlike traditional designs, a torque-limiting clutch brake will not disrupt vehicle operation when improperly applied. Torque-limiting clutch brakes, such as Flowtow et al. (U.S. Pat. No. 4,762,215), have heretofore used a friction coupling between an outer housing and inner collar member. When the torsional force between the housing and collar is too great, they slip relative to each other and thereby avoid damage.

While such torque-limiting designs work relatively well for their intended purpose, the clutch brake still eventually fails and must be replaced. However, prior art torque-limiting clutch brake designs do not split into halves and so must be replaced by lowering and disassembling the clutch and transmission. Furthermore, the components used in prior art friction type torque-limiting mechanisms must be of constant dimension and have no discontinuities in order to maintain a constant slip torque. Therefore, these designs can not readily be made in splittable sections because such sections inherently have discontinuities.

Accordingly, it is a principle object of the present invention to provide a torque-limiting clutch brake which can be removed and installed without disassembling the transmission.

More particularly, it is an object to provide a torque-limiting clutch brake which can be split into halves and put back together.

A related object is to provide an improved torque-limiting mechanism which facilitates such a split design.

SUMMARY OF THE INVENTION

These objects, as well as others that will become apparent upon reference to the accompanying drawings and following detailed description, are provided by a clutch brake which has a torque-limiting detent mechanism and which splits into sections for convenient removal and installation.

An annular inner collar member fits around and engages a transmission gearbox input shaft. This collar includes two semi-circular sections and has one or more catch structures on its outer surface. Rather than using a frictional resistance to rotation, the collar is physically engaged by a torque-limiting intermediate coupling member which includes a resilient detent mechanism. The detent mechanism is adapted to conditionally engage the catch structures of the collar so long as torque on the clutch brake is below a certain force, but release the collar to rotate if torque becomes too great. The above apparatus is contained by an annular outer housing which also splits into semi-circular sections to facilitate convenient removal and installation.

BRIEF DESCRIPTION OF THE DRAWINGS

In describing the preferred embodiment, reference is made to the accompanying drawings wherein.

DETAILED DESCRIPTION OF THE PREFERRED EMBODIMENT

Figure 1:
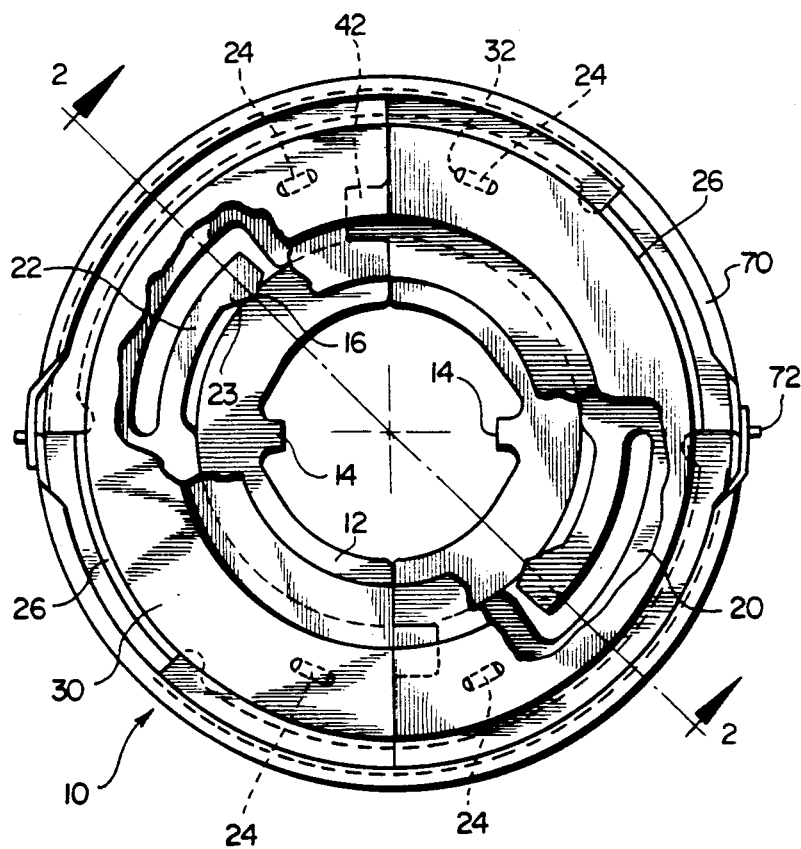
FIG. 1 is a plan view of a torque-limiting clutch brake assembly according to the present invention with portions broken away to show detail.

Turning to the figures of the drawings, there is seen in FIG. 1 a clutch brake assembly, generally indicated by 10, which is both torque-limiting and conveniently replaceable.

Figure 3:
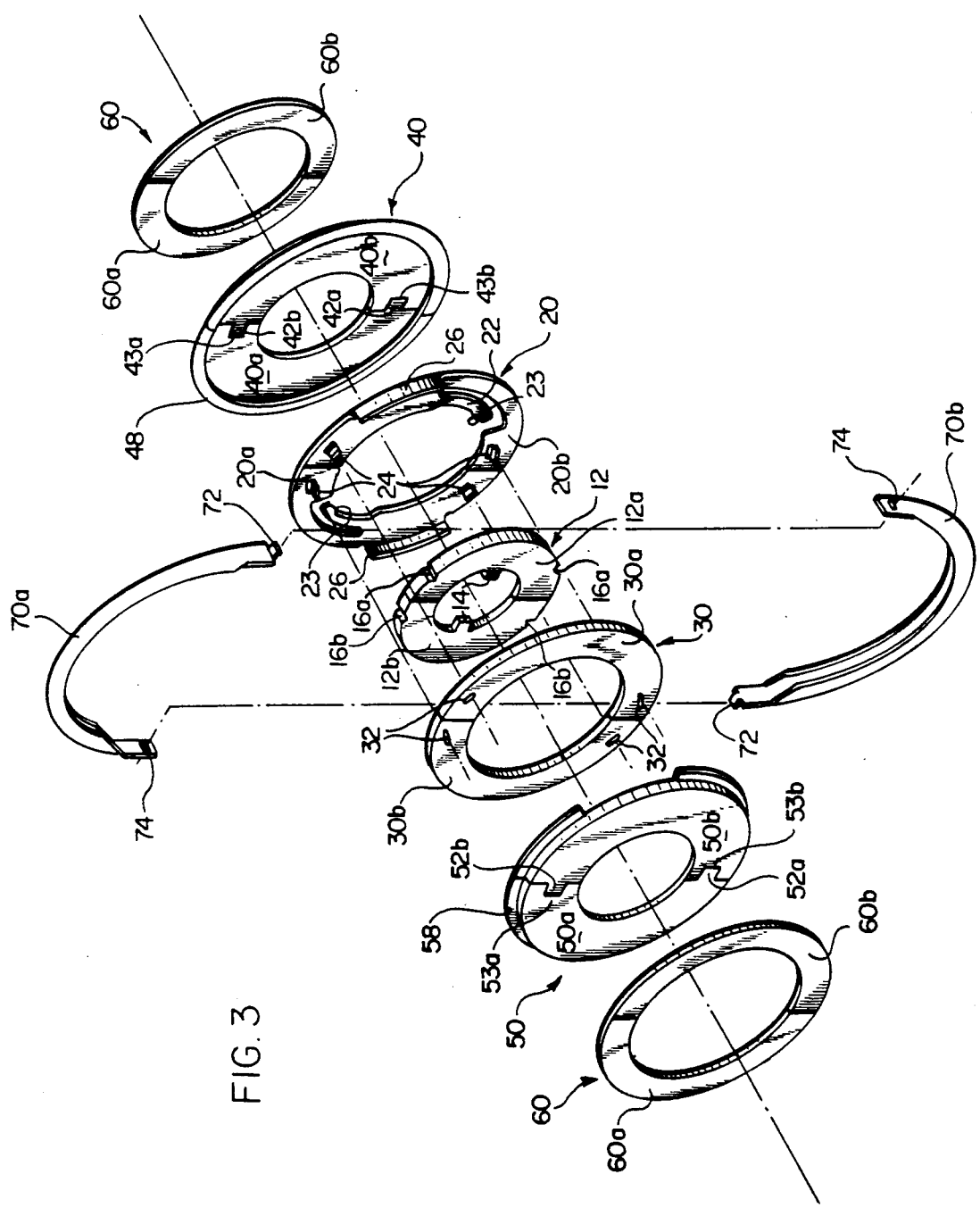
FIG. 3 is an exploded perspective view of the inventive clutch brake assembly.

As best seen in FIG. 3, the preferred embodiment of the present invention is made up of a plurality of ring-shaped members, all of which are preferably made up of two half-ring or semi-circular sections. This sectional design allows the brake to be split into halves for convenient removal and replacement.

The innermost member is collar 12 and includes two halves 12a, 12b, each of which has an inwardly projecting tang 14. The tangs 14 form splines that cooperate with keyways on the gearbox input shaft (not shown) so that rotation of the input shaft drivingly rotates inner collar 12. On the outer surface of collar 12 there are one or more relief or catch structures which can be physically engaged by a resilient detent member, as will be described presently, to prevent the collar from rotating. Specifically, the outer circumferential edge of each half 12a, 12b of inner collar 12 has a depression or indentation 16a, 16b, as best seen in FIG. 1.

Returning to FIG. 3, in the preferred embodiment inner collar 12 is retained by intermediate coupling member 20, which also has two semi-circular halves 20a, 20b. Each half 20a, 20b of coupling member 20 has a resilient peninsula-like arm 22. The free end of each arm 22a, 22b includes an inwardly projecting detent 23a, 23b which is adapted to engage a corresponding depression 16a, 16b in the inner collar 12 when coupling member 20 is placed around inner collar 12, as best seen in FIG. 1. In the preferred embodiment, semi-circular section 12a includes two depressions 16a, and semi-circular section 12b includes two depressions 16b.

Figure 2:
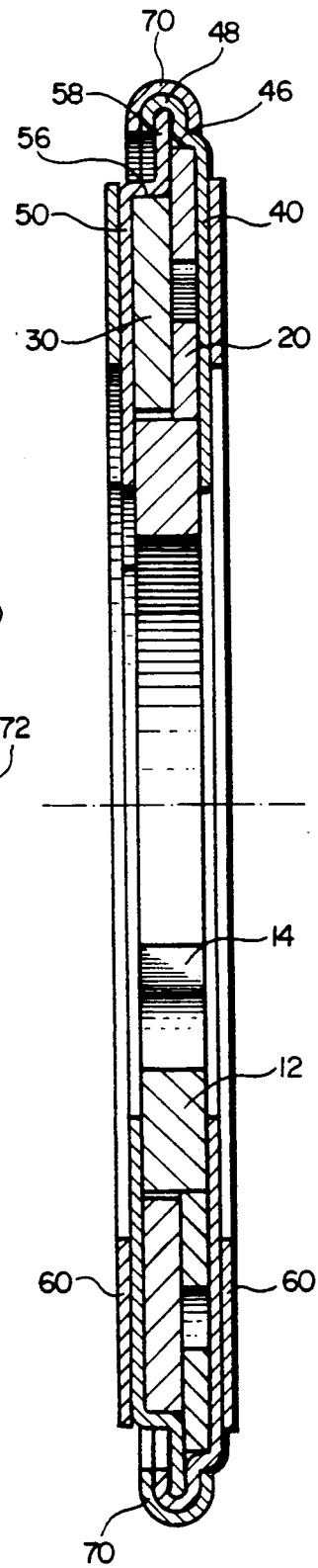
FIG. 2 is a cross-sectional view of the clutch brake assembly taken along line A—A in FIG. 1.

Returning again to FIG. 3, each half 20a, 20b of the coupling member 20 has two aligning tabs 24. These aligning tabs 24 are received within aligning slots 32 located in a two-part spacer ring 30. Coupling member 20 also has a pair of axially extending flanges 26 located along its outer edge. The spacer ring 30 has an outer circumference sized so that it will fit within flanges 26. As best seen in FIG. 2, the combined thickness of spacer ring 30 and coupling member 20 is approximately equal to the thickness of inner collar 12.

The inner members of the clutch brake are contained in an outer housing which, as best seen in FIG. 3, includes two interlocking covers 40 and 50. Cover 40 is made of two semi-circular sections 40a, 40b. Each section 40a, 40b has a mating tab 42a, 42b and notch 43a, 43b which fit with the notch and tab of its corresponding semi-circular section and thereby helps stabilize union of the two sections when installed. As best seen in FIG. 2, cover 40 has a lip portion 46 and an interlock flange 48. When assembled, coupling member 20 rests in the depression of cover 40, with the lip portion 46 disposed about the outer edge of coupling member 20.

Returning to FIG. 3, the other cover 50 is also made of two semi-circular sections 50a, 50b. As with cover 40, each section 50a, 50b also has a mating tab 52a, 52b which fits into a notch 53a, 53b of its corresponding semi-circular section. As best seen in FIG. 2, cover 50 has a lip portion 56 which seats the spacer ring 30 and a straight flange 58 which extends radially from lip portion 56. Interlock flange 48 of cover 40 hooks around straight flange 58 of cover 50, thereby joining the two covers together, as best seen in FIG. 2. Also, as best seen in FIG. 3, there are two discontinuities in the straight flange 58 which align with flanges 26 of coupling member 20. As assembled, flanges 26 fit through these discontinuities so that coupling member 20 positively engages cover 50.

Both covers 40, 50 have friction facings 60 glued to their outer surfaces. These friction facings are also in the form of semi-circular sections 60a, 60b and match the cover sections 40a, 40b and 50a, 50b.

The entire assembly is held together with a clamp ring 70, which also has two sections 70a, 70b. As best seen in FIG. 2, clamp ring sections 70a, 70b are generally U-shaped in axial cross-section and fit around the outside of interlock flange 48 of cover 40. The two sections 70a, 70b of clamp ring 70 are fastened together by clamp tabs 72 which fit into clamp slots 74, as best seen in FIG. 3, and thereby secure the clutch brake assembly together, as best shown in FIG. 1.

When installed around a gearbox input shaft with the clutch and transmission in place in a vehicle (not shown), the clutch brake assembly 10 described above operates in generally the same manner as other clutch brakes. When the driver of the vehicle depresses the clutch pedal a certain distance, the clutch brake assembly is forced against the gearbox housing so that a frictional torsion force is developed and transmitted from the outer housing covers 40 and 50 through the intermediate coupling member 20 to the inner collar 12, which thereby brakes the rotating input shaft. However, in contrast to prior torque-limiting clutch brakes, if the torque on the clutch brake assembly becomes excessive, resilient detent arms 22 of intermediate coupling member 20 are forced out of their depressions 16 of inner collar 12 (as best seen in FIG. 1) and inner collar 12 then spins independent of the clutch brake external housing thereby relieving the excessive torsional stress on the clutch brake. Inner collar 12 will spin until torque on the clutch brake assembly is reduced to the point where detent arms 22 again become engagingly lodged in their corresponding depressions 16.

Using a detent mechanism for limiting the torque on a clutch brake according to the present invention has several benefits. First, and foremost, it will not be significantly impaired by the presence of grooves at the interface of the two inner collar sections 12. When inner collar 12 spins due to excessive torque, detent arms 22 will pass over any grooves or imperfections in the surface of inner collar 12, so long as such grooves are no greater than depressions 16a, 16b. Accordingly, inner collar 12 can be made in sections without degrading the effectiveness and consistency of the torque-limiting feature. Second, a mechanical detent mechanism generates less heat than a frictional torque-limiting design, and therefore the clutch brake may last longer. Third, since the parts used are less susceptible to minor imperfections, a mechanical detent torque-limiting design may cost less to manufacture.

When the clutch brake according to the present invention eventually does wear out, it can be replaced at a substantial savings in cost over other torque-limiting clutch brakes because it is not necessary to lower and disassemble the transmission.

From the foregoing, it can be seen that a torque-limiting clutch brake for facilitating the shifting of gears in a vehicle having a friction clutch has been provided which fully meets the objects of the instant invention. While the device has been described in the terms of a preferred embodiment, there is no intent to limit the invention to the same. On the contrary, it is intended to cover all modifications and equivalents within the scope of the appended claims. Moreover, it should be emphasized that many variations of the present invention will be apparent to one skilled in the art. For example, the semi-circular sections described in the preferred embodiment could have a wide range of generally crescent-like or semi-circular shapes. Furthermore, a torque-limiting design where detents are located on the sides surfaces, rather than outer circumferential edge, of an inner collar or its equivalent could be made according to the present invention. Similarly, a wide range of resilient detent and catch structures could readily be designed, such as using projections, instead of depressions, on the inner collar to catch a resilient detent; or making the resilient detent arm as part of the inner collar member rather than the intermediate coupling member.

What is claimed is:

1. A torque-limiting clutch brake assembly which mounts around a transmission gearbox input shaft, comprising:
    an annular inner collar member including radially inwardly projecting tangs adapted to positively engage the transmission gearbox input shaft and including a catch structure on its outer surface;
    an annular outer housing including a friction enhancing texture on its exterior faces; and
    an intermediate torque-limiting coupling member disposed between said outer housing and said inner collar, said coupling member positively engaging said outer housing and including a resilient detent arm extending generally tangentially to the outer circumferential edge of said annular inner collar, and protruding radially inwardly so as to conditionally engage said catch structure of said inner collar member when torque on the clutch brake is below a predetermined force, while rotatably releasing said inner collar when torque on the clutch exceeds said predetermined force.

2. The clutch brake assembly of claim 1, wherein said annular inner collar, annular housing, and intermediate coupling member each include first and second separable crescent shaped sections so that the clutch brake may be assembled around the gearbox input shaft without requiring extensive transmission disassembly.

3. The clutch brake assembly of claim 2, wherein said annular inner collar member comprises two semi-circular sections which are substantially flat and have spaced substantially parallel opposite side surfaces, said tangs are rectangularly shaped, and said catch structure on the outer surface of said inner collar comprises a depression on each of said first and second sections.

4. The clutch brake assembly of claim 2, wherein said intermediate torque-limiting coupling member comprises two substantially flat and generally semi-circular separable sections, each of said sections including axially projecting alignment tabs, an axially projecting retaining flange located at the outer edge of each said section, and a resilient detent arm.

5. The assembly of claim 4, further including a spacer ring disposed around said inner collar and including first and second separable semi-circular sections.

6. The torque-limiting clutch brake assembly of claim 2, wherein said housing comprises first and second interlocking covers each including first and second separable semi-circular sections, said first cover including an axially extending lip from which extends a radially extending straight flange, said second cover including an axially extending lip from which extends a radially extending interlock flange adapted to retainingly engage said straight flange of said first cover.

7. The assembly of claim 6, further including friction facings secured to the exterior faces of said first and second covers.

8. The assembly of claim 7, further including a clamp ring adapted to securely fasten said first and second covers together.

9. The clutch brake assembly of claim 1 wherein said housing and said intermediate coupling member comprise two distinct components.

10. A torque-limiting clutch brake having an inner collar, an outer housing independently rotatable from said inner collar, and an intermediate torque-limiting coupling member for positively coupling said inner collar and outer housing when the torsional force between said inner collar and outer housing is below a certain threshold amount comprising a detent mechanism, and wherein said inner collar, outer housing, and intermediate torque-limiting coupling member each include first and second separable sections.

11. The clutch brake assembly of claim 10, wherein said annular inner collar member comprises two semi-circular sections which are substantially flat, and said catch structure on the outer surface of said inner collar comprises a depression on each of said first and second sections.

12. The clutch brake assembly of claim 10, wherein said intermediate torque-limiting coupling member comprises two generally semi-circular sections, each said section including a resilient detent arm extending generally tangentially to the inner circumferential edge, and protruding radially inwardly to engage the catch structure of said inner collar.

13. The clutch brake assembly of claim 10 wherein said housing and said intermediate coupling member comprise two distinct components.

14. A torque-limiting clutch brake assembly comprising, in combination:

an annular inner collar including first and second sections, said first and second sections being substantially flat and each section being generally semi-circularly shaped, said first and second sections including radially inwardly projecting tangs on their inner circumferential edges and depressions on their outer circumferential edges;

an annular intermediate coupling member including first and second sections, said first and second sections being substantially flat and each section being generally semi-circularly shaped, said first and second sections including axially projecting alignment tabs and a retaining flange, said tabs being located between the inner and outer edges of the semi-circular sections and the retaining flange being located along the outer edge of the semi-circular sections, said first and second sections also including a resilient detent member protruding radially inward from their inner edges, the inner circumference of said annular coupling member being sized to fit around the outer circumference of said annular inner collar, and said resilient detent members being adapted to engage said depressions of said inner collar;

an annular spacer including first and second sections, said first and second sections being substantially flat and each section being generally semi-circularly shaped, said first and second sections including alignment slots adapted to receive the alignment tabs from said annular intermediate coupling sections, said annular spacer having an inner circumference sized to fit around said annular inner collar and an outer circumference sized to fit within the retaining flange of said coupling member;

first and second annular covers each including first and second sections, each said first and second sections being generally semi-circularly shaped and including a substantially flat radial plate, a lip along the outer edge of said plate, a joining flange extending from the lip, a friction facing on the outer surface of said plate, and a mating tab extending from one end of each section and a mating slot cut into the other end of each section such that the tab and slot of each said first section mates to the slot and tab of each said second section, respectively, said first and second annular covers defining a chamber of sufficient size to house said annular inner collar, said annular intermediate coupling, and said annular spacer;

an assembly clamp ring including first and second sections, said first and second sections being generally semi-ring shaped and having a generally U-shaped cross section with the concavity facing radially inward and adapted to fit over the joining flanges of said first and second annular covers, said first and second sections each including a radially projecting retaining tab on one end and a retaining slot on the other such that the tab of each section retainingly inserts into the slot of the other thereby securing said sections together to form a ring, said assembly clamp ring being adapted to clampingly engage said first and second annular covers.

15. A torque-limiting clutch brake assembly which mounts around a transmission gearbox input shaft, comprising:
- an annular inner collar member including radially inwardly projecting tangs adapted to positively engage the transmission gearbox input shaft and including a catch structure on its outer surface;
- an annular outer housing including a friction enhancing texture on its exterior faces;
- an intermediate torque-limiting coupling member disposed between said outer housing and said inner collar, said coupling member positively engaging said outer housing and including a resilient detent mechanism adapted to conditionally engage said catch structure of said inner collar member when torque on the clutch brake is below a predetermined force, while rotatably releasing said inner collar when torque on the clutch exceeds said predetermined force; and
- wherein said annular inner collar, annular housing, and intermediate coupling member each include first and second separable crescent shaped sections so that the clutch brake may be assembled around the gearbox input shaft without requiring extensive transmission disassembly.

16. The clutch brake assembly of claim 15, wherein said annular inner collar member comprises two semi-circular sections which are substantially flat and have spaced substantially parallel opposite side surfaces, said tangs are rectangularly shaped, and said catch structure on the outer surface of said inner collar comprises a depression on each of said first and second sections.

17. The clutch brake assembly of claim 15, wherein said intermediate torque-limiting coupling member comprises first and second separable sections, said first and second sections being substantially flat and each section being generally semi-circular shaped, said first and second sections including axially projecting alignment tabs, an axially projecting retaining flange located at the outer edge of each said section, and a resilient detent arm extending generally tangentially to the inner circumferential edge, and protruding radially inwardly to engage the catch structure of said inner collar.

18. The clutch brake assembly of claim 17, further including a spacer ring disposed around said inner collar comprising first and second separable semi-circular sections.

19. The clutch brake assembly of claim 15, wherein said housing comprises first and second interlocking covers each including first and second separable semi-circular sections, said first cover including an axially extending lip from which extends a radially extending straight flange, said second cover including an axially extending lip from which extends a radially extending interlock flange adapted to retainingly engage said straight flange of said first cover.

20. The clutch brake assembly of claim 19, further including friction facings secured to the exterior faces of said first and second covers.

21. The clutch brake assembly of claim 20, further including a clamp ring adapted to securely fasten said first and second covers together.

22. The clutch brake assembly of claim 15 wherein said housing and said intermediate coupling member comprise two distinct components.

* * * * *